(12) United States Patent
Picozzi

(10) Patent No.: US 10,239,149 B2
(45) Date of Patent: Mar. 26, 2019

(54) DEVICE OF ELECTRIC SLIDING CONTACT, WELDING HEAD FOR ROLLER WELDING MACHINES AND RELATED ROLLER WELDING MACHINE

(71) Applicant: SARES S.p.A., Assago (MI) (IT)

(72) Inventor: Alessandro Pancrazio Picozzi, Assago (IT)

(73) Assignee: SARES S.P.A., Assago (MI) (IT)

( * ) Notice: Subject to any disclaimer, the term of this patent is extended or adjusted under 35 U.S.C. 154(b) by 315 days.

(21) Appl. No.: 15/115,833

(22) PCT Filed: Nov. 19, 2014

(86) PCT No.: PCT/IB2014/066157
§ 371 (c)(1),
(2) Date: Aug. 1, 2016

(87) PCT Pub. No.: WO2015/118391
PCT Pub. Date: Aug. 13, 2015

(65) Prior Publication Data
US 2017/0165783 A1 Jun. 15, 2017

(30) Foreign Application Priority Data
Feb. 4, 2014 (IT) .............................. MI2014A0159

(51) Int. Cl.
*B23K 11/06* (2006.01)
*B23K 11/30* (2006.01)
(Continued)

(52) U.S. Cl.
CPC .......... *B23K 11/06* (2013.01); *B23K 11/3036* (2013.01); *B23K 11/366* (2013.01); *B23K 2101/18* (2018.08)

(58) Field of Classification Search
CPC ... B23K 11/06; B23K 11/3036; B23K 11/366; B23K 2101/18; B23K 2201/18
(Continued)

(56) References Cited

U.S. PATENT DOCUMENTS 7,837,086 B2 * 11/2010 Brice .................. B23K 1/0006
228/107
9,969,027 B2 * 5/2018 Dieterich ........... B23K 11/0876
(Continued)

FOREIGN PATENT DOCUMENTS

| DE | 935324 C | 11/1955 |
|---|---|---|
| DE | 4321503 A1 | 1/1995 |
| GB | 1187805 A | 4/1970 |

OTHER PUBLICATIONS

International Search Report and Written Opinion for International Application No. PCT/IB2014/066157 ( dated Mar. 20, 2015) (9 pages).

*Primary Examiner* — Eric S Stapleton
(74) *Attorney, Agent, or Firm* — Lucas & Mercanti, LLP

(57) ABSTRACT

A sliding electric contact device for welding head for roller welding machines, having a bimetallic plate adapted to be fixed to a shaft of a welding head, having a protection base composed of a first metal, defining a first face destined to abut against an end surface of the shaft, and a sliding disk composed of a second metal softer than the first metal, defining a second sliding electric contact face; a composite current-carrying block, having a plait of electrical wires, an internal support made of metal, pushed against the sliding disk for realizing with the sliding disk a sliding electric contact, first means adapted to fix firmly a central portion of the plait to the inner support, second current-carrying means adapted to fix firmly a peripheral portion of the plait to current terminals of a stator of the welding head. A welding (Continued)

head having the sliding electric contact device and a related roller welding machine are also disclosed.

11 Claims, 17 Drawing Sheets

(51) Int. Cl.
*B23K 11/36* (2006.01)
*B23K 101/18* (2006.01)

(58) Field of Classification Search
USPC .......................................................... 219/81
See application file for complete search history.

(56) References Cited

U.S. PATENT DOCUMENTS

| | | | | |
|---|---|---|---|---|
| 2002/0195430 | A1* | 12/2002 | Sgrignuoli | B23K 11/3036 |
| | | | | 219/81 |
| 2008/0244878 | A1* | 10/2008 | Hoehe | A44B 18/0007 |
| | | | | 24/445 |
| 2008/0290143 | A1* | 11/2008 | Neklyudov | B21B 1/38 |
| | | | | 228/265 |
| 2009/0017328 | A1* | 1/2009 | Katoh | B23K 9/173 |
| | | | | 428/653 |
| 2010/0269975 | A1* | 10/2010 | Brice | B23K 1/0006 |
| | | | | 156/73.1 |
| 2012/0168200 | A1* | 7/2012 | Iwai | B23K 11/115 |
| | | | | 174/126.1 |
| 2014/0332514 | A1* | 11/2014 | Holverson | B23K 9/0953 |
| | | | | 219/130.01 |

* cited by examiner

Sez. B-B

Sez. C-C

Sez. D-D

DEVICE OF ELECTRIC SLIDING CONTACT, WELDING HEAD FOR ROLLER WELDING MACHINES AND RELATED ROLLER WELDING MACHINE

CROSS-REFERENCE TO RELATED APPLICATIONS

This application is a 371 of PCT/IM2014/066157, filed Nov. 19, 2014, which claims the benefit of Italian Patent Application No. MI2014A000159 filed Feb. 4, 2014.

TECHNICAL FIELD

This disclosure relates to roller welding machines and more particularly to a device of electric sliding contact, a welding head for roller welding machines and a related roller welding machine.

BACKGROUND

Roller welding machines are appliances for welding metal sheets along edges or along junctures with a continuous process during which a roller that passes over the pieces to be welded is used as electrode. These machines have a pair of electrodes installed on both sides of the plates to be welded directed along the thickness of the plates, the opposed faces of the two plates being welded one to the other for constituting a welded portion. Each electrode is sized so as to convey a relatively strong welding current throughout the plates to be welded.

The contact resistance between the plates to be welded is generally much greater than the electric resistance of electrodes, than that of the plates themselves and than the contact resistances between electrodes and plates, thus the welding current will generate heat for Joule effect essentially in correspondence of the interface between the two plates that will melt and, when pressed one against the other by two rollers (anode and cathode) or by the roller and the plane electrode (anode and cathode), will weld one to the other.

Typically, roller welding machines comprise:
 a welding head having an anode (or cathode) roll, typically made of copper, destined to be crossed by a relatively great current;
 a cathode (or anode) electrode that may be circular or planar, typically made of copper, destined to be connected to the pole opposite to that of the anode roller. In case of a rotating electrode, it will be counter-rotating in respect to the anode roller so as to follow the forward motion of the two plates to be welded during the welding operation. In case of a planar electrode, its function is to act as a static bearing for ensuring the electric contact needed for current flowing;
 elastic means for pulling the anode roller towards the cathode electrode so as to press the two plates to be welded placed between the rollers or between a roller and a planar electrode.

Typically the welding head has a stator, electrically connected with a voltage generator, on which a cave shaft is pivotally mounted by means of ball bearings. The anode roller is fixed to the cave shaft and is cooled by contact with a ball bearing flange that has communicating grooves with the inner cavity of the shaft so as to define inner channels for circulating a coolant, so as to prevent the roller from overheating and melting the surface of the plate with which it comes into contact. Substantially, the cooled anode roller has thermal dissipation properties better than those of the material to be welded in order to dissipate heat on the surface of the seam joint. From a thermal point of view, the anode roller sinks heat from the joint so as to attain thermal equilibrium.

The shaft may eventually be connected through gears to a motor for making it rotate, so as to have, with appropriate appliances, the constant control of the peripheral speed of the roller in all phases of the welding path and the consequent regulation of the remaining welding parameters (pull force between the electrodes, welding periods, etc.). An eventual motorization of the anode roller allows to prevent micro-sliding and bonding of the same during the welding.

A typical constructive problem of the welding heads is the fact that the stator is connected to a current generator and it is necessary to provide electric connections at low resistance for transferring relatively high currents to the anode roller.

It is well known in the art to use sliding contacts, fixed to the stator, pressed against the cave shaft so as to minimize contact resistance. Typically, these sliding contacts are placed against the circumference of the shaft and are pulled against the shaft along a radial direction.

An drawback of these radial sliding contacts is the fact that they are subjected to wear and tear and it is necessary to disconnect the shaft from the stator in order to proceed to their substitution.

It is also known the use of a cave shaft of the type shown in FIG. 1, belonging to a welding head of roller welding machine made by Soudronic. It is shaped so as to have a pair of opposed sliding annuli 2 that surround the body 1 of the cave shaft, inside which the coolant flows. Respective rings 3 of the type shown in the frontal view of FIG. 2 and in the back view of FIG. 3, are pressed against both sides of the annuli 2. These rings are composed of:
 a metal plait 6, typically made of copper, for providing current;
 an external metal flange 4a and a corresponding external metal counter-flange 4b, with fixing holes 5 to the stator of the welding head, that together hold an external portion of the metal plait 6;
 a ring shaped sliding element 7, typically made of silver, destined to be placed in contact with a respective annulus 2;
 an inner metal flange 8, shown in FIG. 3, that cooperates with the ring shaped sliding element 7 for sandwich holding the metal plait 6.

The metal plait 6 is thus a flexible mechanical constraint between the outer flanges 4a and 4b, fixed to the stator of the welding head, and the sliding ring shaped element 7, that follows eventual longitudinal motion of the cave shaft and is always in contact with the annuli 2 as far as the ring-shaped element wears.

As shown in FIG. 3, the metal plait 6, the inner metal flange 8 and the sliding ring shaped element 7 are fixed together by means of a zigzag welding 9, in order to prevent tangential forces during the sliding make the sliding ring shaped element 7 move in respect to the metal plait 6.

A drawback of such a system consists in that the shown shaft is fabricated by lathe-shaping a single block of copper so as to define the annuli 2 and the body 1. This operation make its manufacturing onerous because the annuli 2 must be relatively large so as to have a small resistance to current conduction, thus time and production costs of the piece shown in FIG. 1 are relatively high.

Moreover, realizing the sliding contact 3 is a relatively expensive operation because it is relatively difficult to realize the zigzag welding 9.

Finally, as for the welding heads with radial sliding contacts, it is required to dismount the shaft from the stator for unscrewing the rings 3, that are periodically replaced because the silver sliding element 7 wears during the use. Also the shaft, because of friction with the sliding element 7, is subjected to wear and this may lead to the replacement of the shaft, even if less frequently than the ring shaped sliding contact 3.

In order to obviate to these problems, there are welding heads without sliding contacts wherein there is a gap between the stator and the rotor that defines an enclosed space that is filled with a current conducting liquid, typically mercury. Even if the enclosed space is nominally waterproof sealed, there are always small leakages due to use, thus current conducting liquid shall be periodically added.

This solution allows to avoid the use of sliding contacts, though it has been forbidden by laws because mercury is toxic.

SUMMARY

In order to obviate to the above drawbacks of the welding head containing current conducting liquid, the applicant designed a welding head embedding a sliding electric contact device that, differently from the known welding heads, has characteristics so as to make extremely simple its replacement. The sliding contact device of this disclosure is substantially different from the known sliding contact devices and can be fabricated without executing complex laser welding operations, ensuring at the same time current transmission from the shaft and avoiding to wear the shaft and thus avoiding to replace it.

This outstanding result has been obtained with a sliding electric contact device for welding head for roller welding machines, comprising:
- a bimetallic plate adapted to be fixed to a shaft of a welding head, having a protection base composed of a first metal, defining a first face destined to abut against an end surface of the shaft, and a sliding disk composed of a second metal softer than the first metal, defining a second sliding electric contact face;
- a composite current-carrying block, comprising:
    - a plait of electrical wires,
    - an internal support made of metal, pushed against the sliding disk for realizing with the sliding disk a sliding electric contact,
    - first means adapted to fix firmly a central portion of the plait to the inner support,
    - second current-carrying means adapted to fix firmly a peripheral portion of the plait to current terminals of a stator of the welding head.

According to an embodiment, the internal support has a central threaded portion; the first means comprise a tightening threaded element concentric with the internal support and screwed on the internal support so as to tighten as a sandwich the central portion of the plait; the second means for carrying current comprise:
- a first current-carrying flange threaded in its inner portion made of metal, concentric with the inner support and fixed to the stator,
- an externally threaded fixing element, concentric with the first current-carrying flange, fixed to the stator together with the first current-carrying flange for tightening as a sandwich the peripheral portion of the plait.

With the sliding electric contact of this disclosure it has been possible to realize a welding head in which it is possible to replace the wearable parts while keeping integrity of the shaft. This welding head comprises:
- a shaft;
- a stator having means adapted to support the shaft in a rotating manner;
- a device of electric sliding contact according to this disclosure, wherein the bimetallic plate is fixed to the shaft;
- means for pushing the inner support of the device of electric sliding contact against the respective sliding disk.

The claims as filed are integral part of this specification and are herein enclosed by reference.

DETAILED DESCRIPTION

Figure 1:
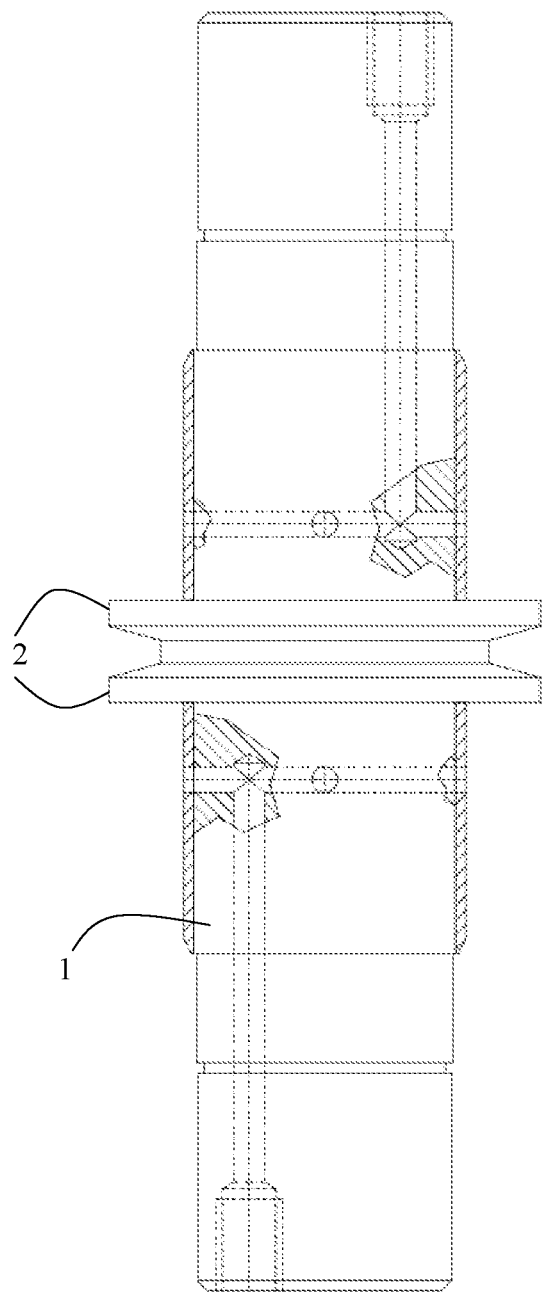
FIG. 1 depicts a shaft of a known welding head with sliding contact annuli.
Figure 2:
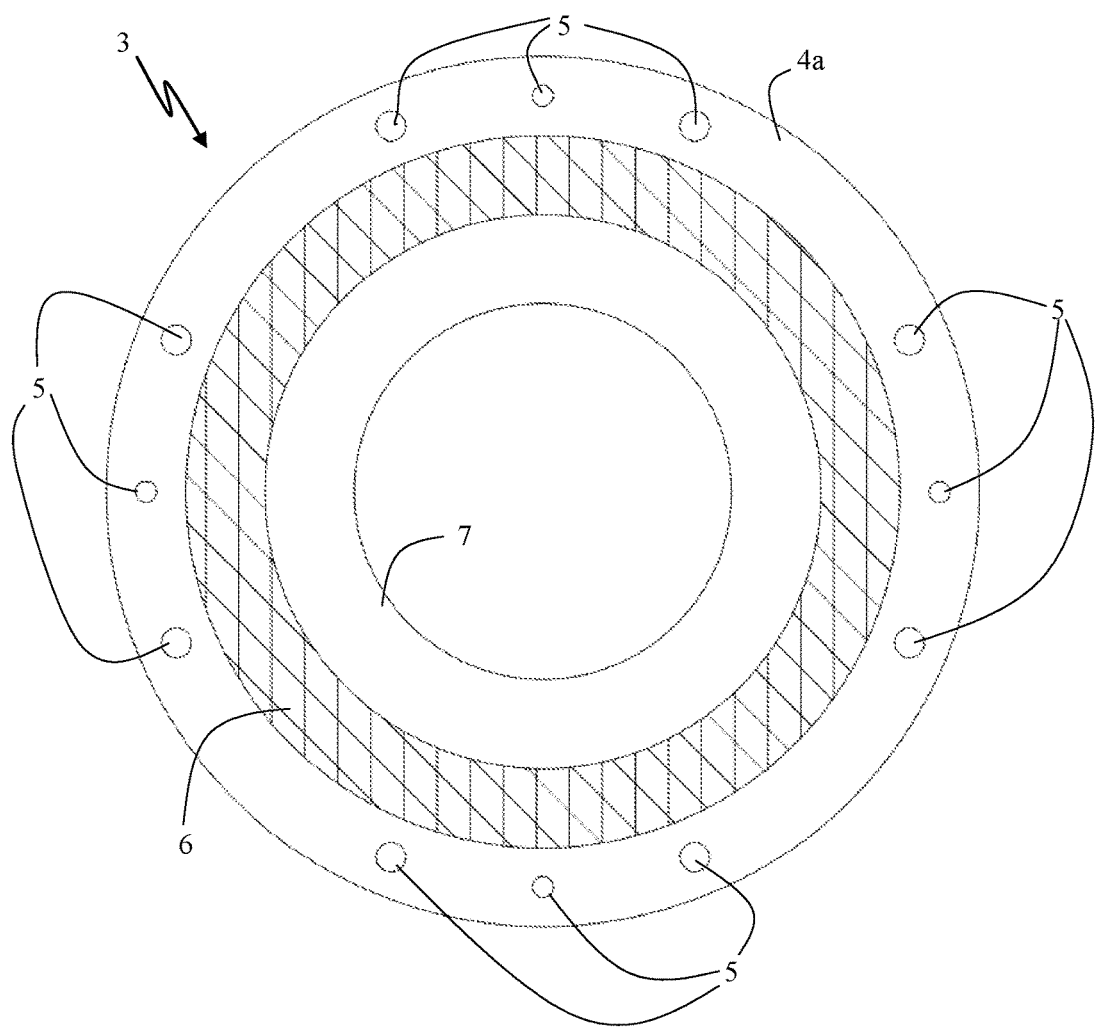
FIG. 2 is a view of a known sliding ring shaped element destined to abut against one of the annuli of the shaft of FIG. 1.
Figure 3:
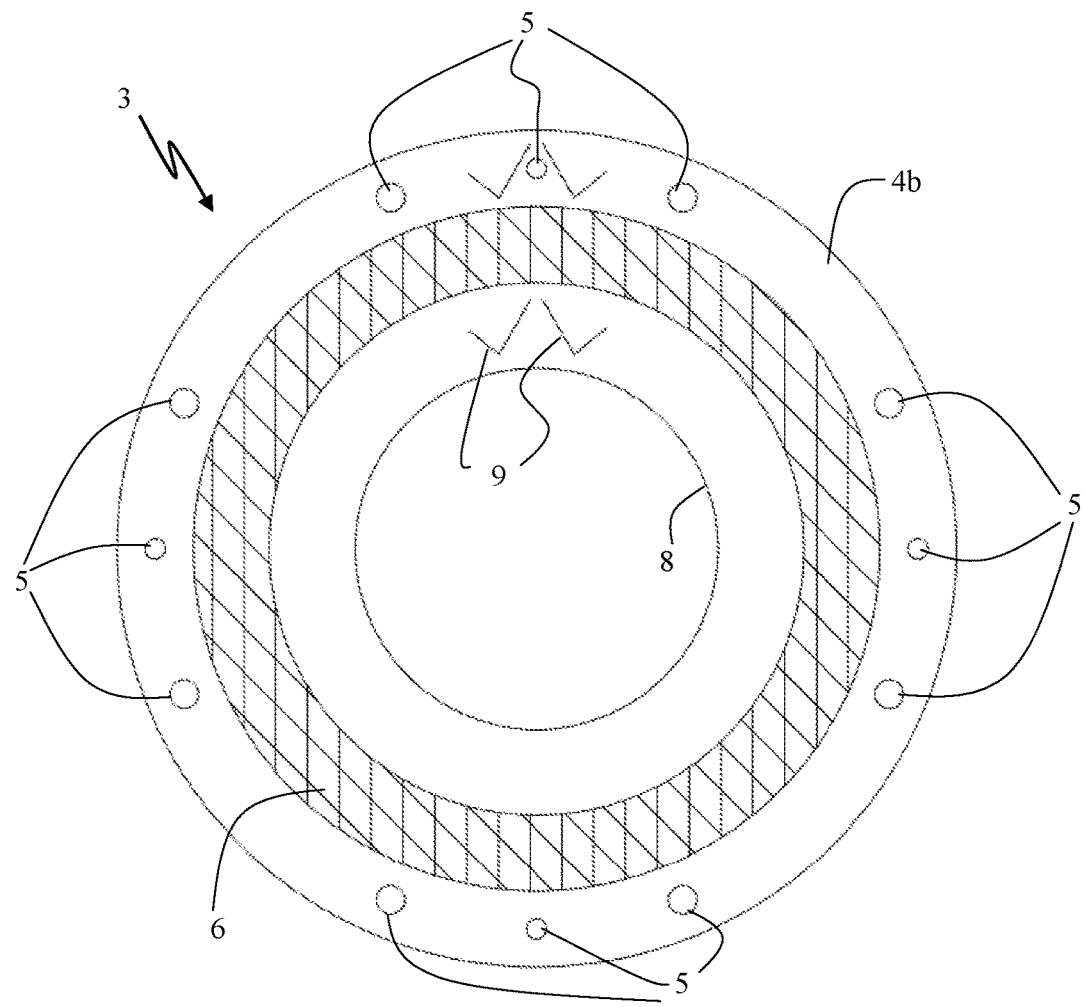
FIG. 3 is a view of a known sliding ring shaped element opposed to that of FIG. 2, in which there is a zigzag welding of the current-carrying plait of the ring.
Figure 4:
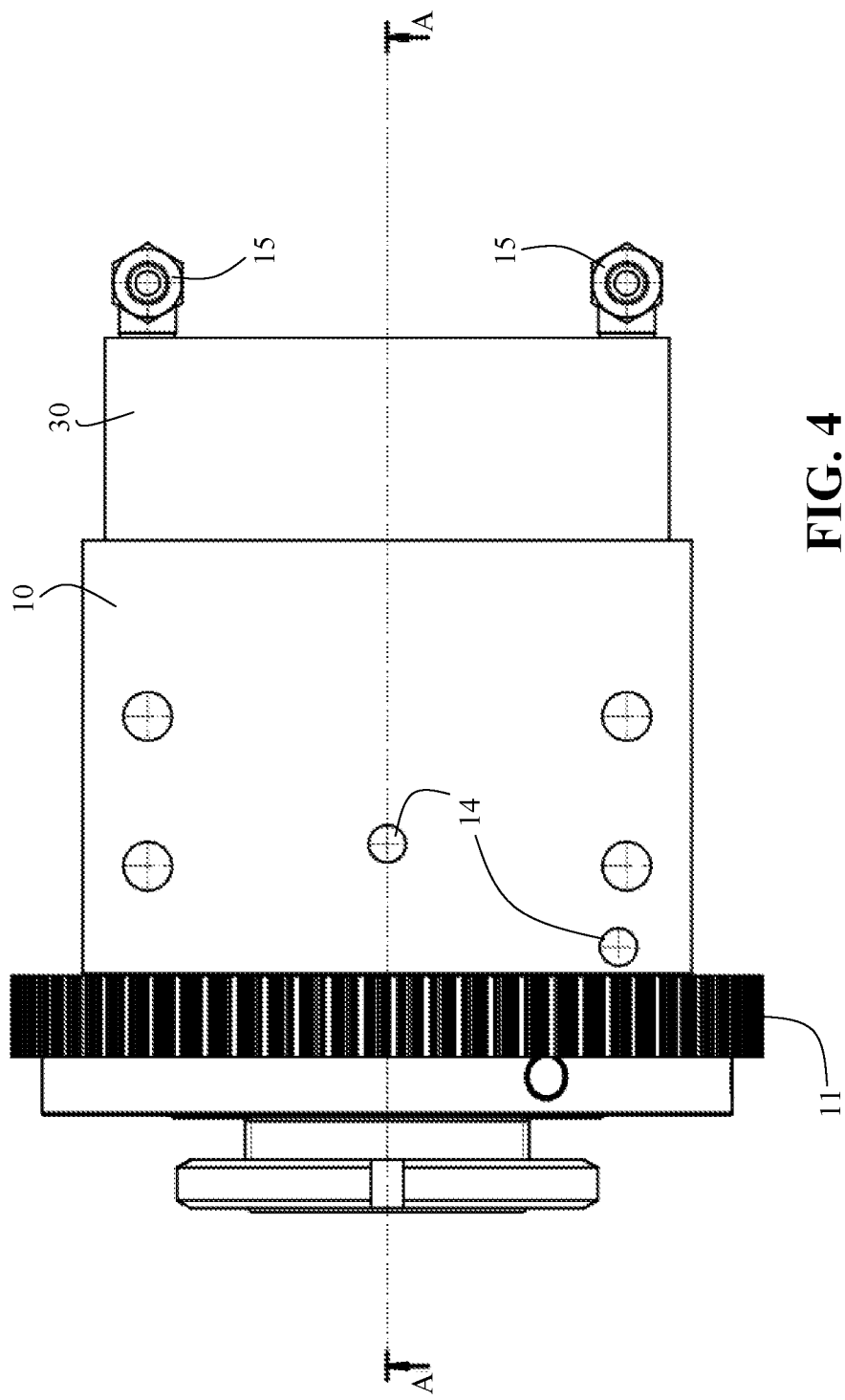
FIG. 4 is a top view of a welding head according to this disclosure.
Figure 5:
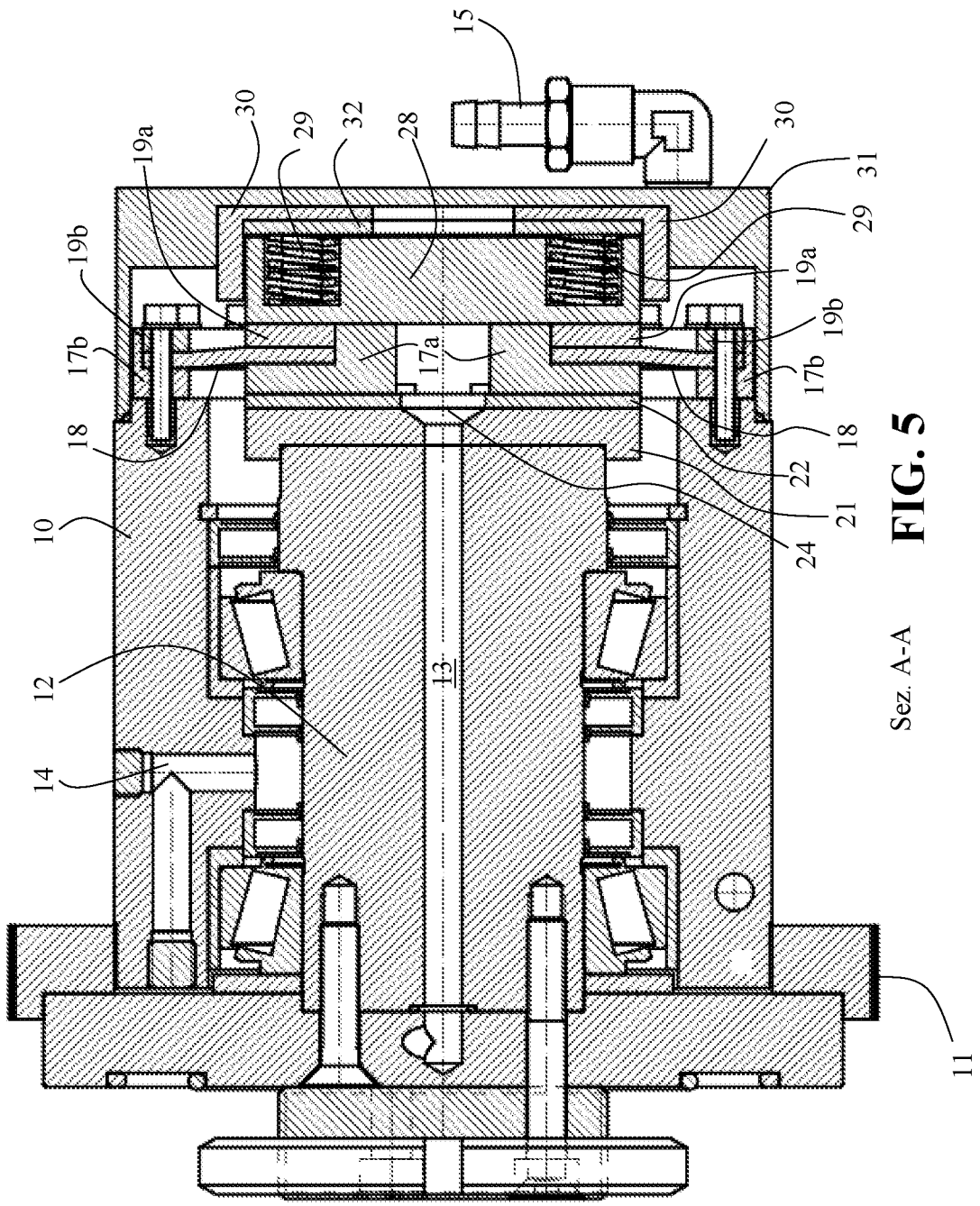
FIG. 5 is a sectional view of the welding head of FIG. 4.
Figure 6:
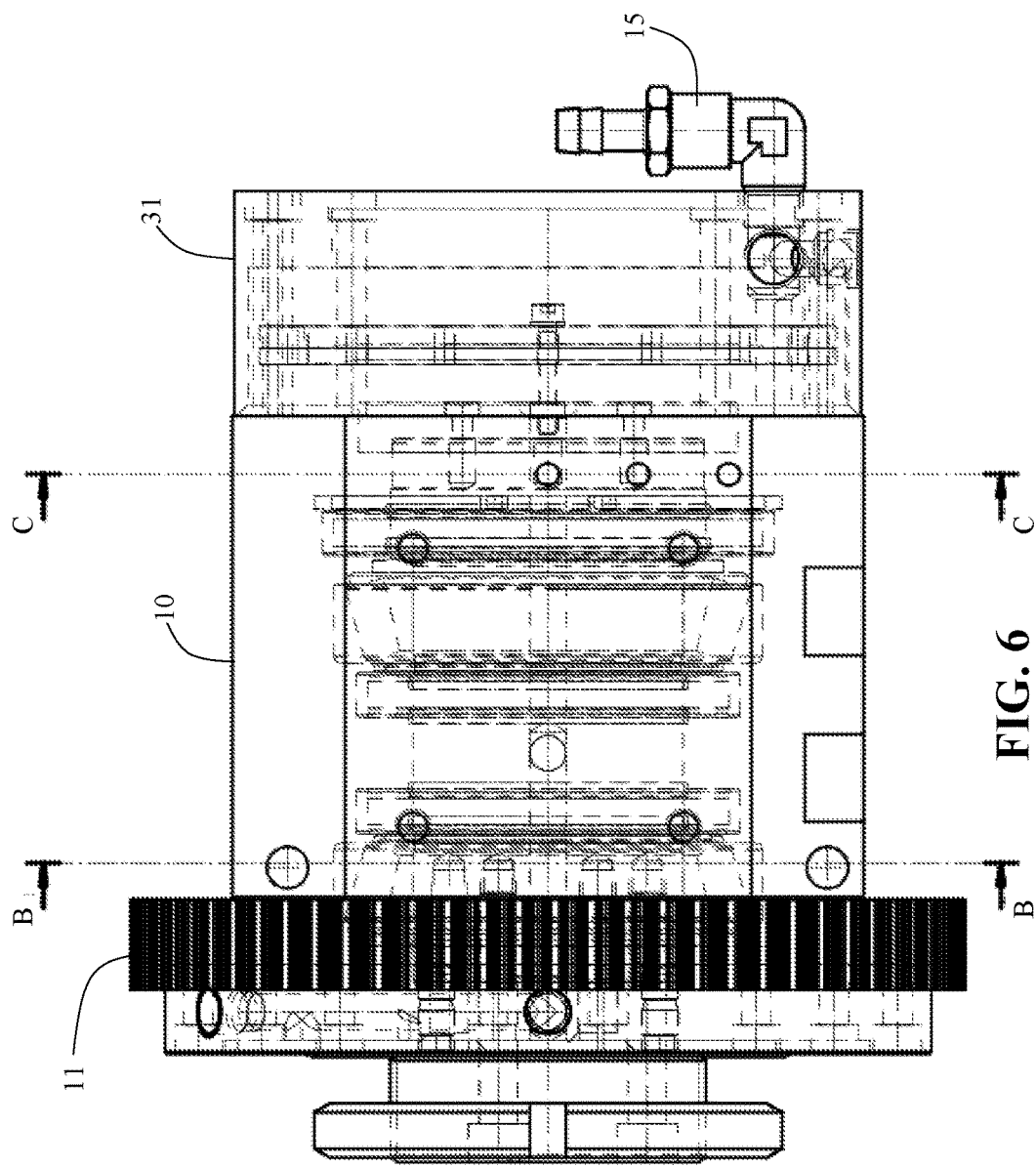
FIG. 6 is a side view of a welding head according to this disclosure.
Figure 7:
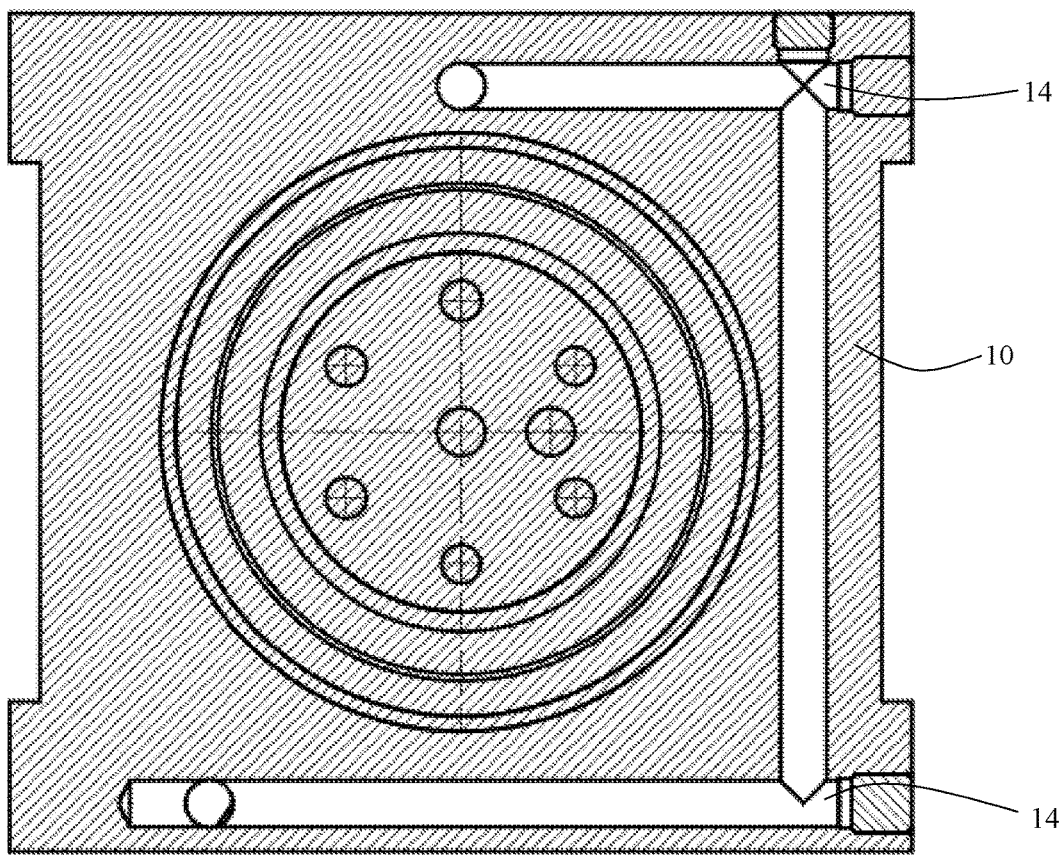
FIGS. 7 and 8 show sectional views of the welding heads of FIG. 6.
Figure 8:
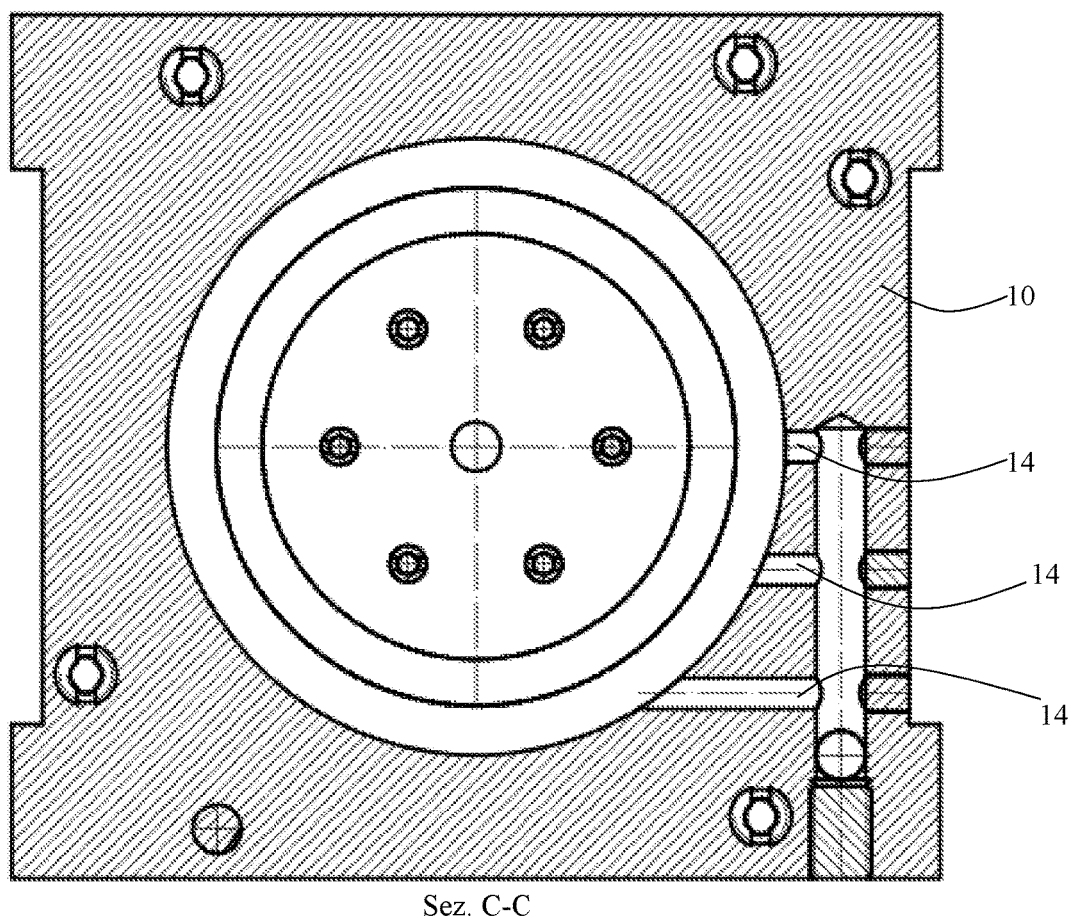
Figure 9:
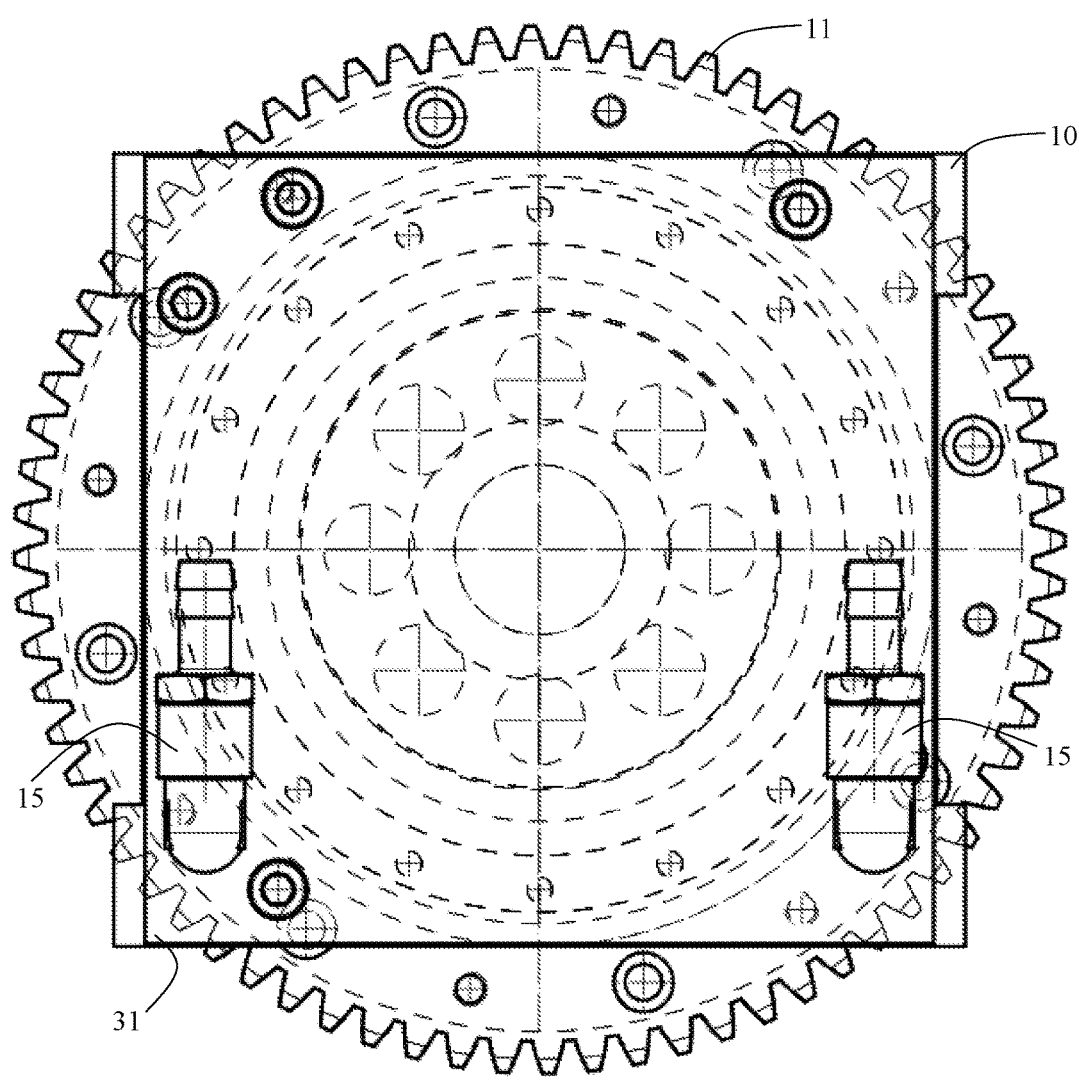
FIG. 9 is a back view of a welding head according to the present disclosure.
Figure 10:
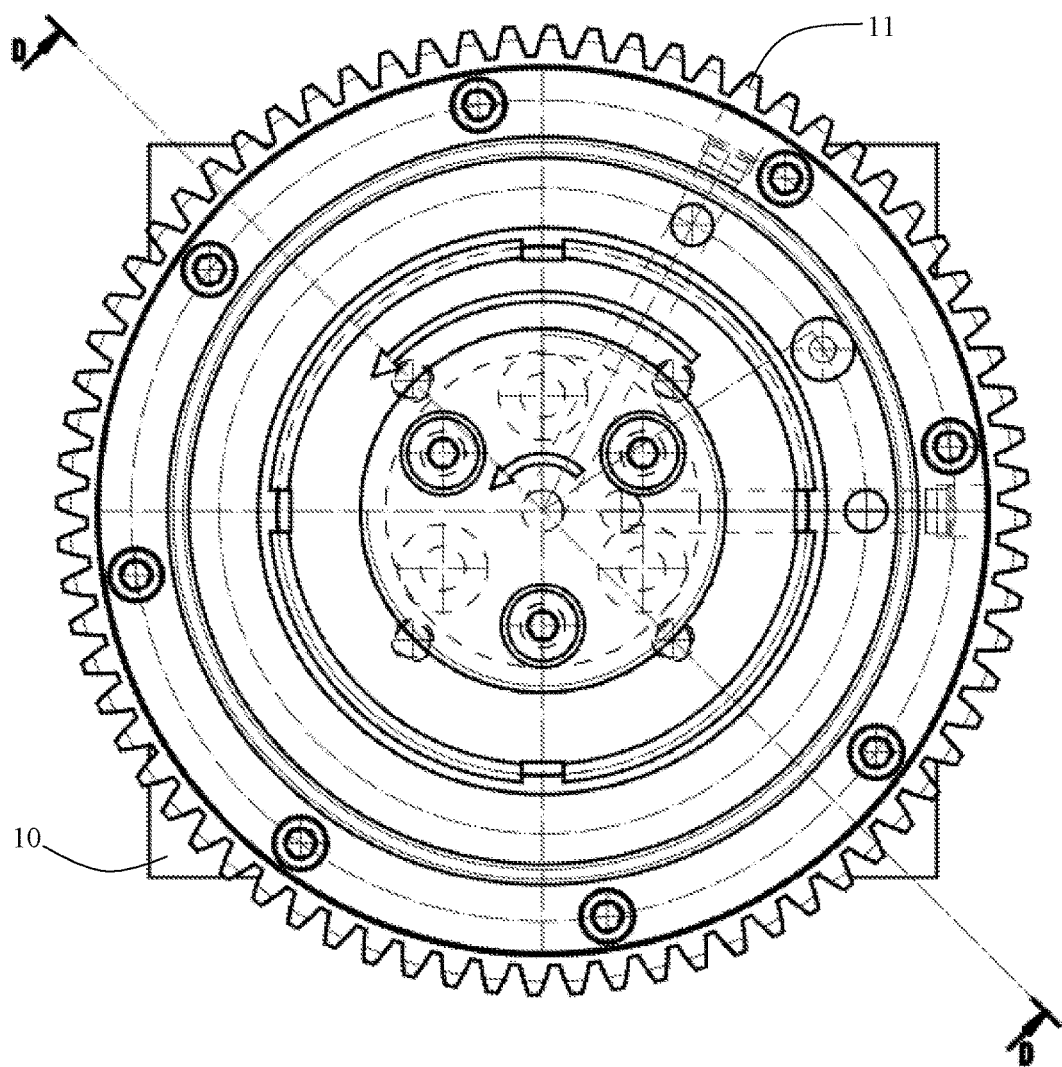
FIG. 10 is a front view of a welding head according to this disclosure.
Figure 11:
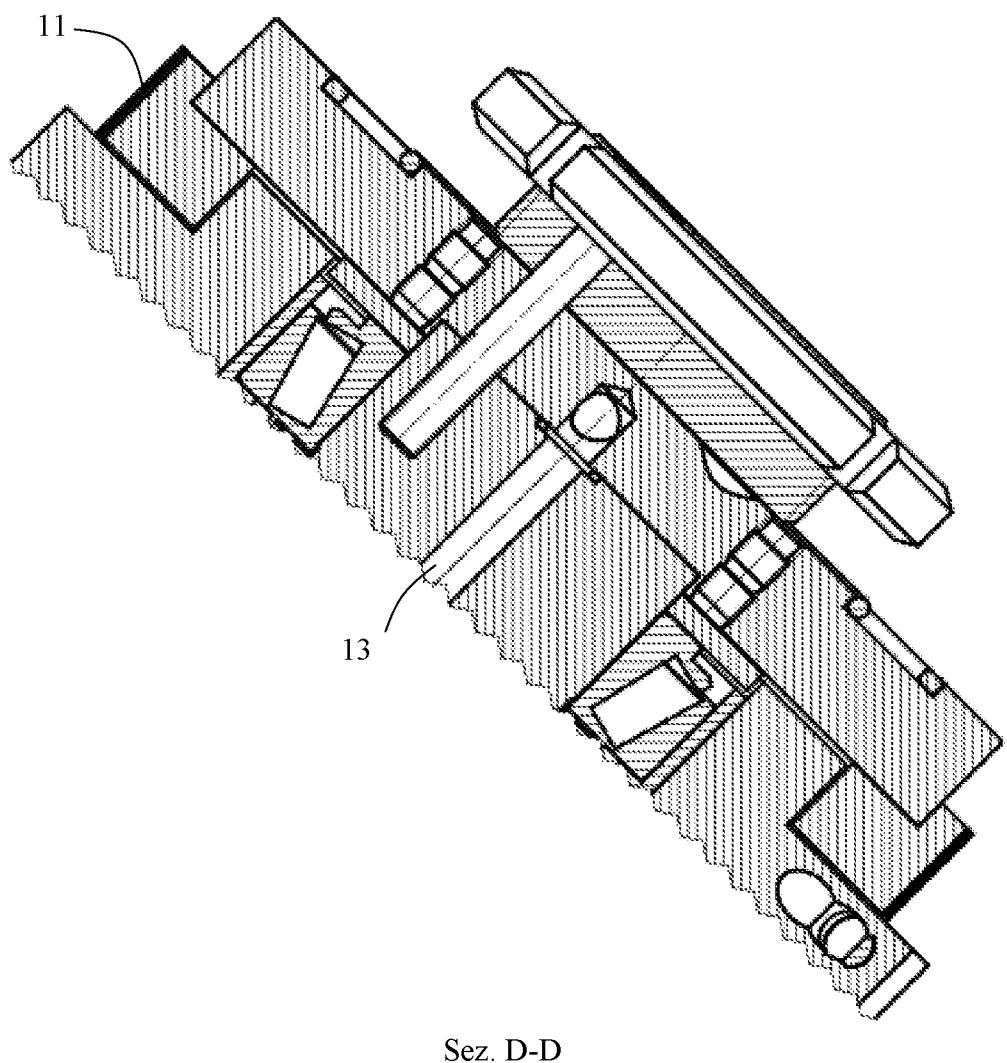
FIG. 11 is a sectional view of the welding head of FIG. 10.
Figure 12:
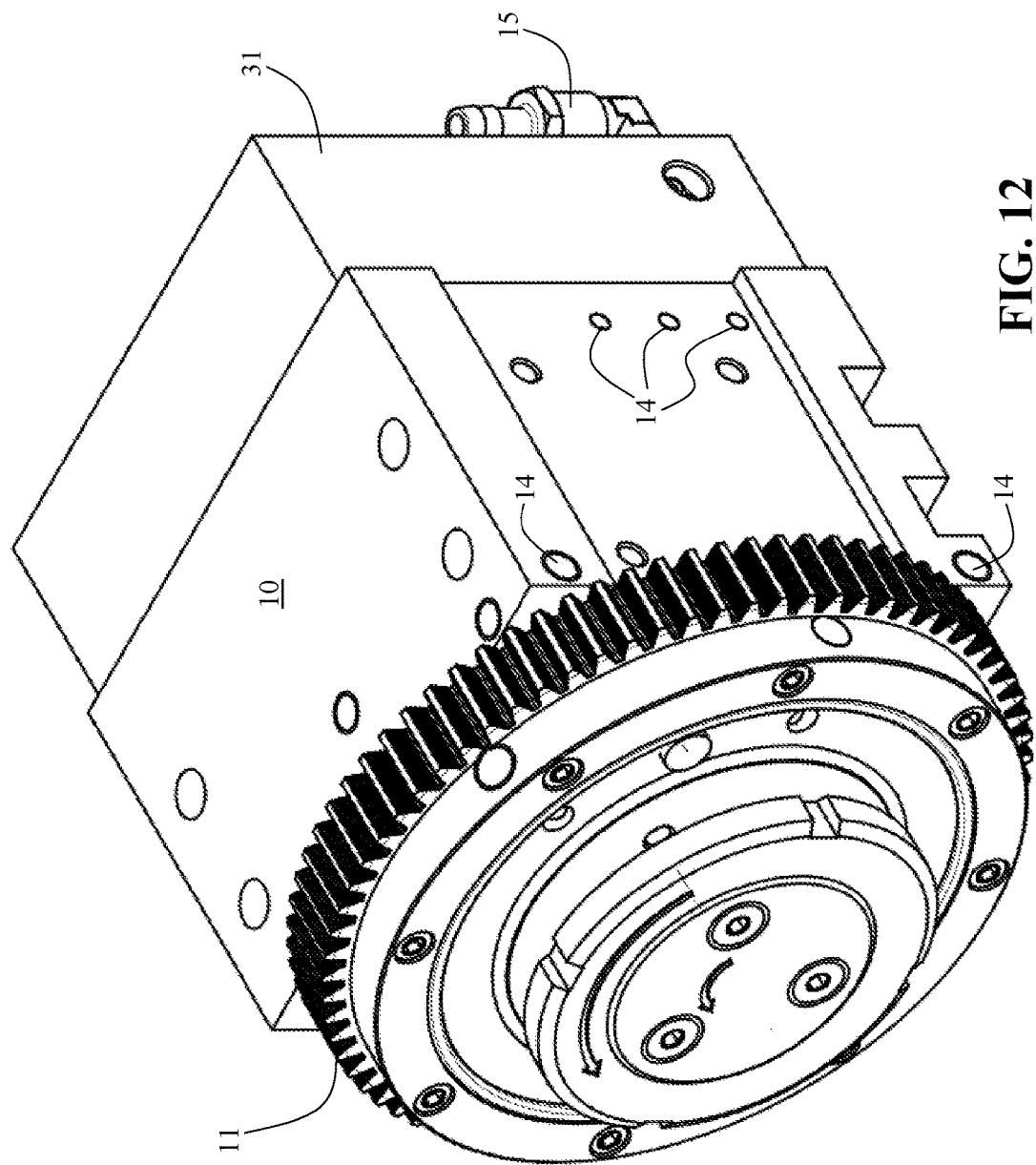
FIG. 12 is an axonometric view of a welding head according to this disclosure.
Figure 13:
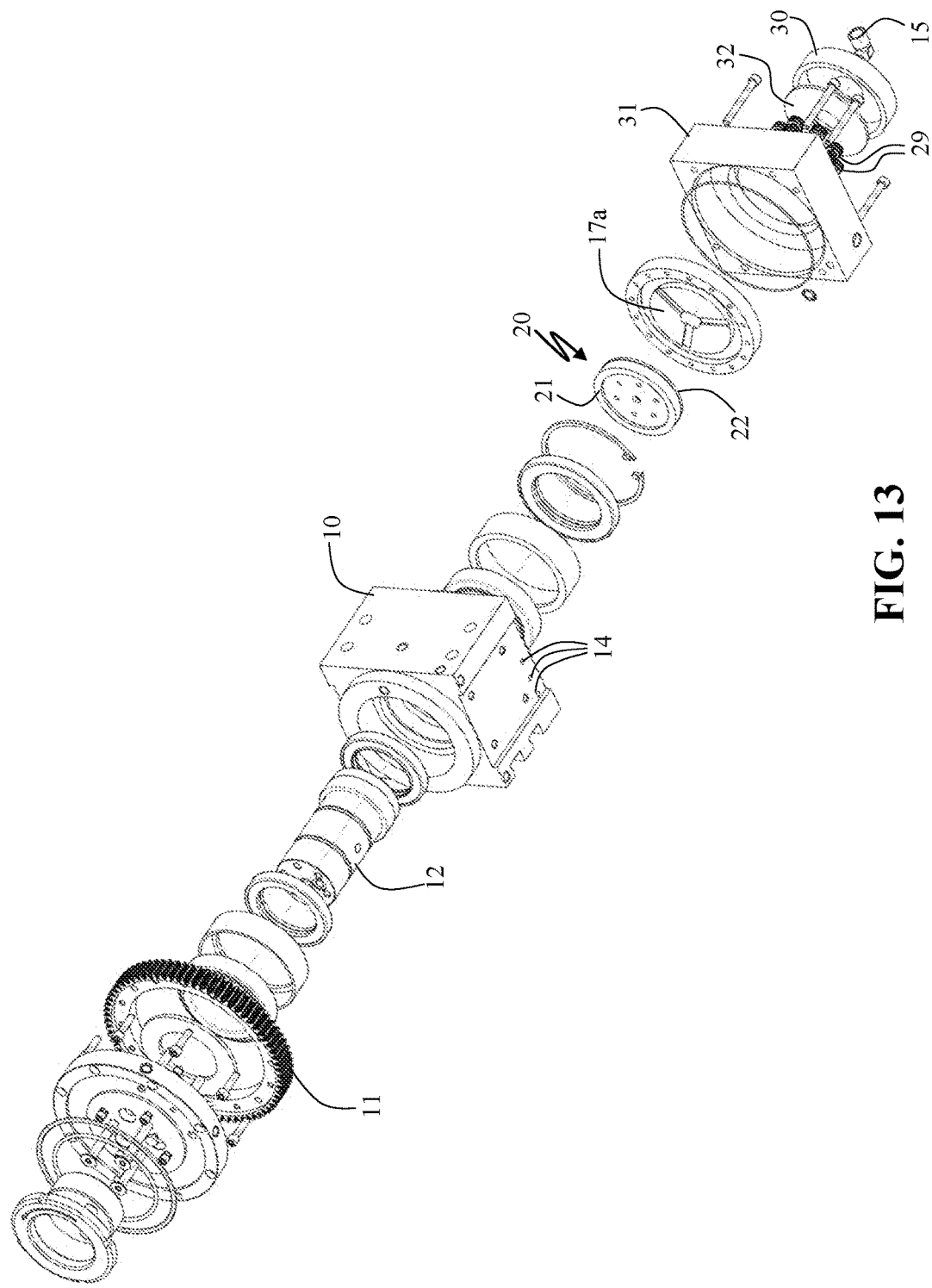
FIG. 13 is an exploded view of a welding head according to this disclosure.

An embodiment of the welding head of this disclosure is shown in figures from 4 to 15. It comprises a stator 10 that pivotally supports, for example by means of ball bearings, a cave shaft 12 made of a first metal, for example copper, on a terminal portion of which is coupled and electrically connected a welding anode (or cathode) roller, not shown. The shaft 12 has a substantially cylindrical axial cavity 13 that crosses it longitudinally and that is in communication with inner grooves of a ball bearing flange destined to come into contact with the anode (or cathode) roller and in the stator 10, in order to make the coolant supplied throughout inlet holes 14 enter in the stator and exits therefrom throughout the outlets 15.

Figure 14C:
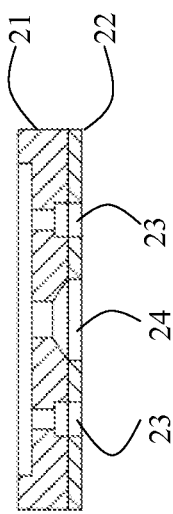
FIGS. 14*a*, 14*b*, 14*c* and 14*d* show a bi-metallic plate of a sliding electric contact device according to this disclosure respectively from the side of the sliding disk destined to realize a sliding contact, in a sectional view, in an axonometric view and from the side of the protection base destined to be placed in contact with a shaft of the welding head.
Figure 14A:
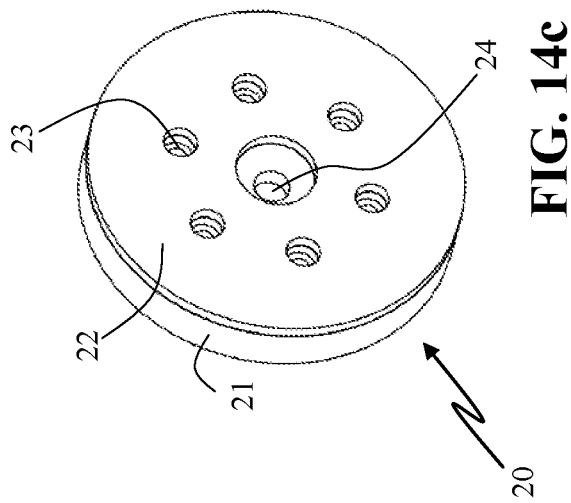
Figure 14B:
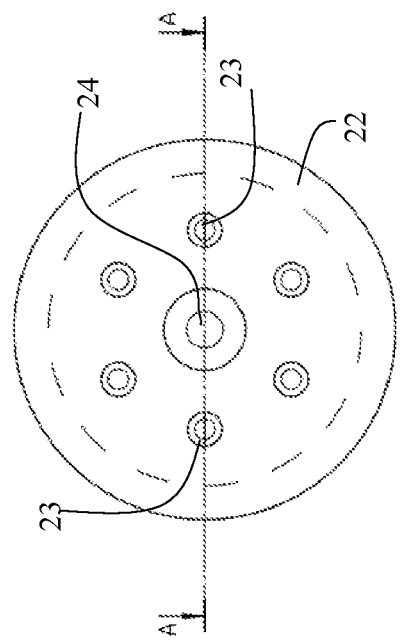
Figure 14D:
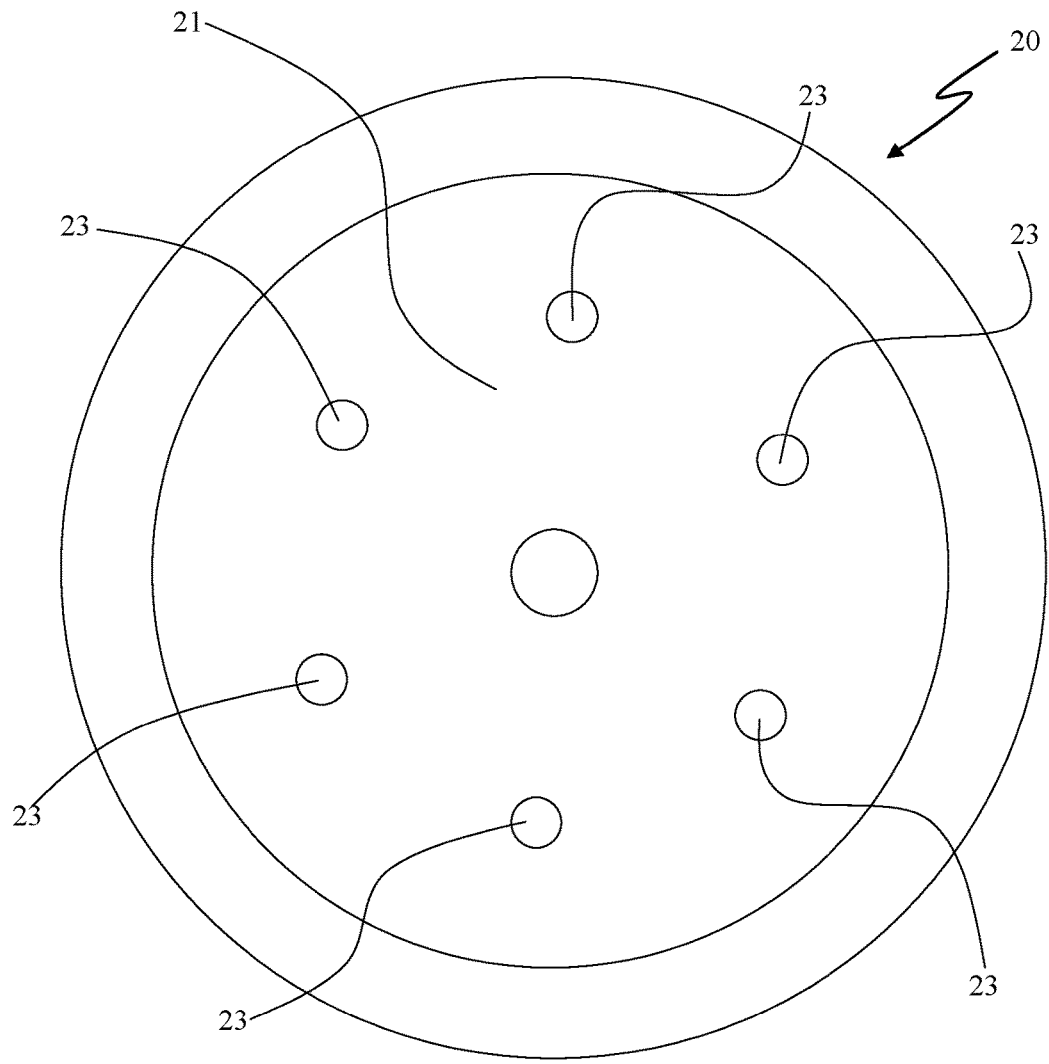

Against the surface of the opposite terminal portion of the shaft 12, along all its thickness except in correspondence of the cavity 13, a bi-metallic plate 20 is fixed, an embodiment of which is shown in FIGS. 14*a*, 14*b*, 14*c* and 14*d*. It is composed of:
- a bored protection base 21 made of a first metal, for example of copper, shaped so as to cover the whole cross section of the cave shaft but the axial cavity 13 of the shaft through which the coolant circulates, in correspondence of which there is a properly flared hole 24, and
- a sliding disk 22 made of a second metal softer than the first metal, for example silver, preferably braze welded to the base 21, so as to minimize contact electric resistance between the two different metals.

Conveniently, the bi-metallic plate has screwing holes 23 that cross the sliding disk and the base, and that correspond to as many blind screwing holes in the body of the shaft, so as to be fixed in a removable fashion to the cave shaft 12 and to be easily substituted. The material composing the base 21 is a very good electric conductor, as well as the cave shaft 12, thus the contact resistance between the base 21 and the cave shaft 12 is negligible even if they are not welded one to the other.

The sliding contact with the disk 22 is realized with a composite current-carrying block 17*a*, 17*b*, 18, 19*a*, 19*b*, an embodiment of which is shown in the drawings 15*a*, 15*b*, 15*c* and 15*d*, screwed to the stator 10 of the welding head. The composite block comprises:
- a plait 18 of electrical wires, for instance made of copper;
- an inner support 17*a* made of metal, for example of the first type, on which grooves 25 are defined extending radially and defining circulation conduits of coolant fluid that from periphery wets radially the inner support 17*a* and enters in the axial cavity of the shaft;
- a threaded tightening element 19*a* concentric with the inner support 17*a* and screwed thereupon so as to tighten as a sandwich a central portion of the plait 18;
- a first current-carrying flange 17*b* made of metal, for example of the first type, concentric with the inner support 17*a* and having holes 26 for being fixed to the stator 10;
- a fixing element 19*b*, concentric with the first current-carrying flange 17*b* and screwed inside it so as to tighten as a sandwich a peripheral portion of the plait 18 of electrical wires. The fixing element 19*b* is bored together with the first current-carrying flange 17*b* so as to have corresponding passing holes 26 for fixing to the stator 10.

In the shown embodiment, conveniently the plait of electric wires 18 acts as flexible mechanical (as well as electrical) connection between the inner support 17*a* and the first current-carrying flange 17*b*, whilst the tightening element 19*a* and the fixing element 19*b* tighten the plait 18. The first current-carrying flange is rigidly fixed to the stator, whilst the inner support 17*a* may displace in axial direction by exploiting the flexibility of the plait for following eventual longitudinal motion due to wear of the disk 22 and of the inner support 17*a* of the sliding contact by keeping the contact thereof while being worn.

Conveniently, the central portion of the inner support 17*a* is cylindrical and threaded, preferably with a refined pitch. Preferably, the tightening threaded element 19*a* is shaped as an internally threaded ring destined to tighten a central circular portion of the plait 18. Blind holes 27 in the cylindrical central portion of the inner support 17*a* will conveniently allow to insert therein plugs for keeping fixed the support 17*a* whilst the threaded element 19*a* is screwed. Conveniently, once screwed, the tightening element 19*a* will be riveted so as to deform its screw threading to prevent any risk of unintentional unscrewing.

Conveniently, the inner portion of the first current-carrying flange 17*b* is cylindrical and threaded, preferably with a refined pitch. Preferably, the threaded fixing element 19*b* is shaped as an externally threaded ring destined to tighten a circular peripheral portion of the plait 18. Blind holes (not shown in the figures, being pilot holes for the final holes 26) in the fixing element 19*b* will conveniently allow to insert therein plugs for screwing it to the current-carrying flange 17*b* blocked by rotation with appropriate stirrups.

Conveniently, once screwed, the fixing element 19*b* will be riveted so as to deform its screw threading to prevent any risk of unintentional unscrewing.

The welding head has also a presser 28 for pressing the support 17*a* against the sliding disk 22. It has housings in which springs 29 are installed, that may eventually be replaced with other elastic elements, pulling against a center plate 32 and an isolating cover 30 of the back cover 31 of the welding head.

According to an embodiment, the presser 28 is pressed against the support 17*a* and the tightening element 19*a* by 8 springs that exert the axial force needed to ensure the contact.

The tangential forces exerted during the sliding against the inner support 17*a* are discharged throughout the plait 18 on the stator. The plait 18 is firmly tightened at the middle between the support 17*a* and the tightening threaded element 19*a* and at the periphery between the first and second flanges, thus there is not any risk that it may slide. As a consequence, it is not necessary to weld it to the support 17*a* for keeping it fixed. Moreover, the friction between the presser element 28 and the first inner flanges helps in resisting to the tangential forces. To this end, for example, the tightening element 19*a* will be a drawn metal piece.

According to an embodiment, the welding head of this disclosure has a gear 11 fixed to the cave shaft for rotating it through a coupling with a belt, pinion or chain depending on the use. The welding head in case of other application could eventually have no gear in order to make it neutral.

Differently from the prior welding head applied in the welding machine manufactured by Soudronic described hereinbefore, the substantially cylindrical cave shaft of the roller head of this disclosure does not have sliding annuli that, as stated above, may be fabricated only by means of a long and expensive shaping with a lathe of a single block of copper.

In the shown embodiment, the sliding contact does not take place against the shaft, that is not subjected to wear, and this allows to keep one of the components that mainly determine the costs for fabricating the welding head.

Figure 15C:
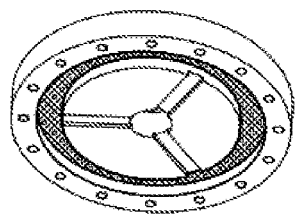
FIGS. 15*a*, 15*b*, 15*c* and 15*d* show a composite current-carrying block of a sliding electric contact device according to this disclosure respectively from the side of the support destined to realize a sliding contact with the sliding disk, in a sectional view, in an axonometric view and from the side destined to come into contact with a presser for pulling the inner support 17*a* against the sliding disk shown in FIG. 14*a*.
Figure 15B:
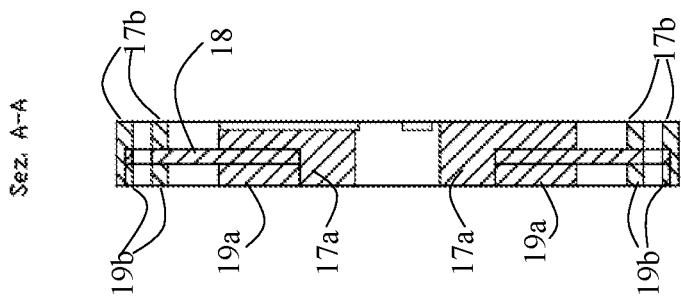
Figure 15A:
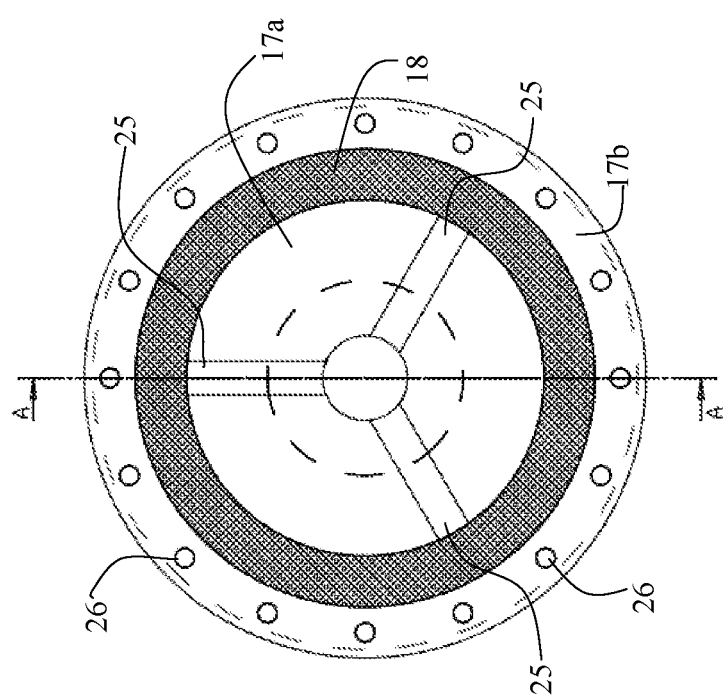
Figure 15D:
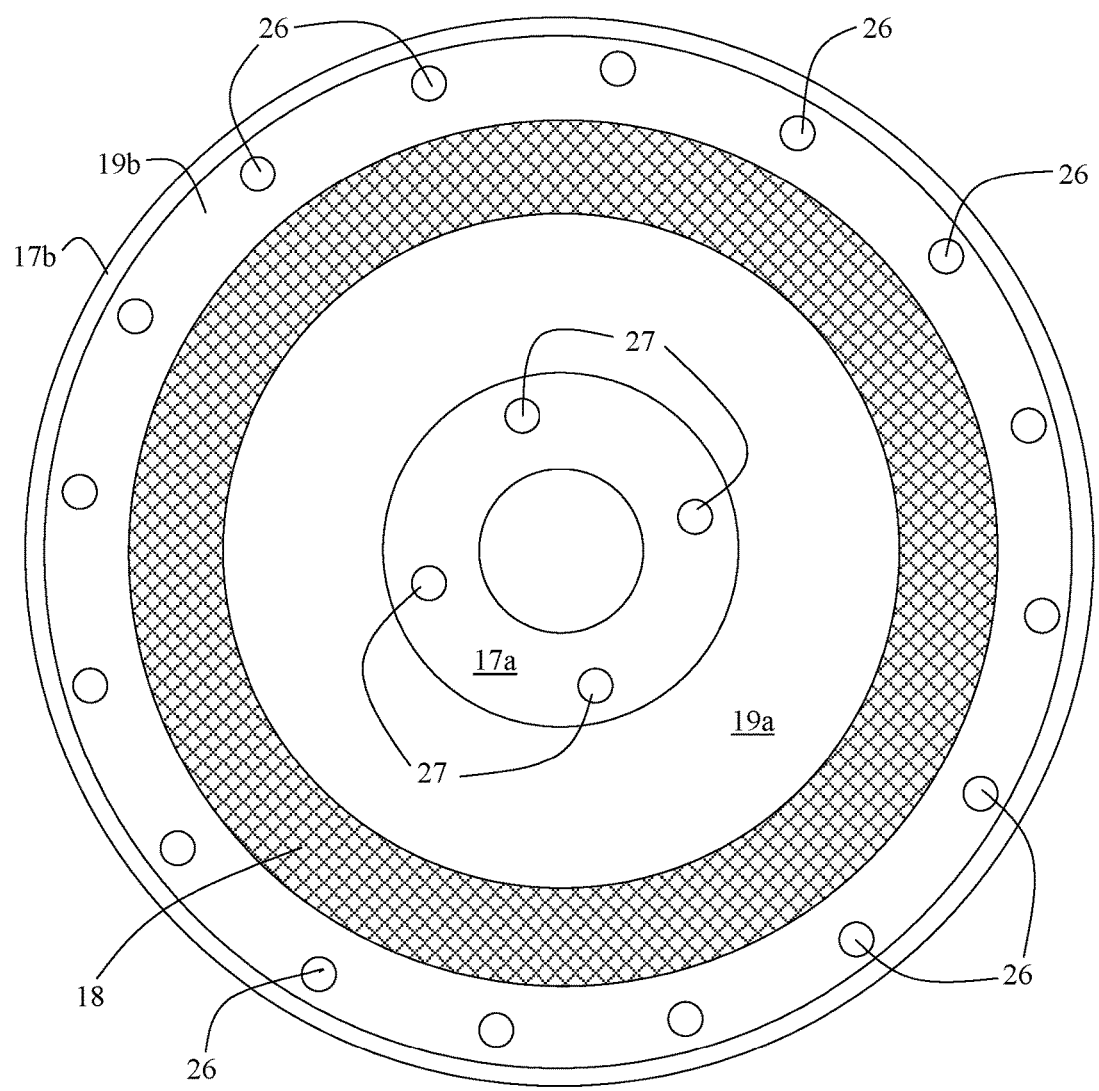

The sliding contact takes place along a surface that substantially corresponds to the whole transversal section of the shaft and not only to a peripheral portion thereof, thus the peripheral sliding speed is as an average smaller, because the sliding as an average takes place closer to the neutral central axis of the shaft, with a consequent reduction of wear and tear of the sliding contact. Moreover, it is not necessary to dismount the shaft from the stator and to free it from the ball bearings for replacing the wearable portions, that is the sliding disk 22 and eventually also the inner support 17*a*, because the sliding contact device of FIGS. 14*a*, 14*b*, 14*c*, 14d and 15a, 15b, 15c and 15d is positioned at an end portion of the shaft, thus it may be replaced simply by removing the back cover 31, the isolating cover 30, the holding central plate 32 and by removing the presser 28.

The invention claimed is:

1. A device of electric sliding contact for roller welding heads for roller welding machines, comprising:
   a bimetallic plate adapted to be fixed to a shaft of a welding head, having a protection base composed of a first metal, defining a first face destined to abut against an end surface of said shaft, and a sliding disk composed of a second metal softer than said first metal, defining a second sliding electric contact face;
   a composite current-carrying block comprising:
      a plait of electrical wires;
      an internal support made of metal, pushed against said sliding disk for realizing with the sliding disk a sliding electric contact;
      first means adapted to fix firmly a central portion of the plait to the inner support; and
      second current-carrying means adapted to fix firmly a peripheral portion of the plait to current terminals of a stator of the welding head.

2. The device of electric sliding contact according to claim 1, wherein grooves that extend radially and that define circulation conduits of coolant are defined on said internal support.

3. The device of electric sliding contact according to claim 1 wherein:
   said internal support has a central threaded portion;
   said first means comprise a tightening threaded element concentric with the internal support and screwed on the internal support so as to tighten as a sandwich said central portion of the plait;
   said second means for carrying current comprise:
      a first current-carrying flange threaded in its inner portion made of metal, concentric with the inner support and fixed to the stator; and
      an externally threaded fixing element, concentric with the first current-carrying flange, fixed to the stator together with the first current-carrying flange for tightening as a sandwich said peripheral portion of the plait.

4. The device of electric sliding contact according to claim 1, wherein said sliding disk is braze welded to said protection base.

5. The device of electric sliding contact according to claim 1, wherein said first metal is copper and said second metal is silver.

6. A roller welding head for roller welding machines, comprising:
   a shaft;
   a stator supporting said shaft in a rotating manner;
   the device of electric sliding contact according to claim 1 wherein said bimetallic plate is fixed to said shaft; and
   a pushing system configured to push the inner support of the device of electric sliding contact against the respective sliding disk.

7. The roller welding head according to claim 6, wherein:
   an axial cavity for circulating coolant through the welding head is defined in said shaft; and
   radially extending grooves are formed on said inner support to define coolant circulation conduits communicating with said axial cavity.

8. The roller welding head according to claim 6, wherein said pushing system configured to push the inner support against the sliding disk comprises:
   a presser having a first face, abutted against said composite current carrying block, and a second face opposite to the first face;
   a back cover fixed in a removable manner to said stator; and
   spring washers installed such to be compressed between said second face of the presser and said back cover.

9. The roller welding head according to claim 6, wherein:
   said shaft is composed of said first metal and has blind holes for socket head screws in correspondence of the end surface abutted against the bimetallic plate of the sliding electric contact;
   the protection base and the sliding disk of the bimetallic plate have through holes for socket head screws corresponding to the blind holes of the shaft; and
   the bimetallic plate is fixed in a removable manner to the shaft by means of socket head screws.

10. The roller welding head according to claim 6, further comprising a gearwheel and an anode/cathode roller connected to said shaft in correspondence of a terminal end of the shaft opposed to said end surface against which said bimetallic plate is fixed.

11. A roller welding machine comprising the roller welding head according to claim 6.

* * * * *